No. 666,342. Patented Jan. 22, 1901.
C. M. CARNAHAN.
CAR TRUCK.
(Application filed May 1, 1900.)
(No Model.)

Witnesses:
R. J. Edwards
J. H. Moore.

Inventor
Cyrus M. Carnahan
by O. M. Clarke
his Attorney.

THE NORRIS PETERS CO., PHOTO-LITHO., WASHINGTON, D. C.

UNITED STATES PATENT OFFICE.

CYRUS M. CARNAHAN, OF ALLEGHENY, PENNSYLVANIA.

CAR-TRUCK.

SPECIFICATION forming part of Letters Patent No. 666,342, dated January 22, 1901.

Application filed May 1, 1900. Serial No. 15,156. (No model.)

*To all whom it may concern:*

Be it known that I, CYRUS M. CARNAHAN, a citizen of the United States, residing at Allegheny, in the county of Allegheny and State of Pennsylvania, have invented certain new and useful Improvements in Car-Trucks, of which the following is a specification, reference being had to the accompanying drawings, forming part of this specification, in which—

Figure 1:
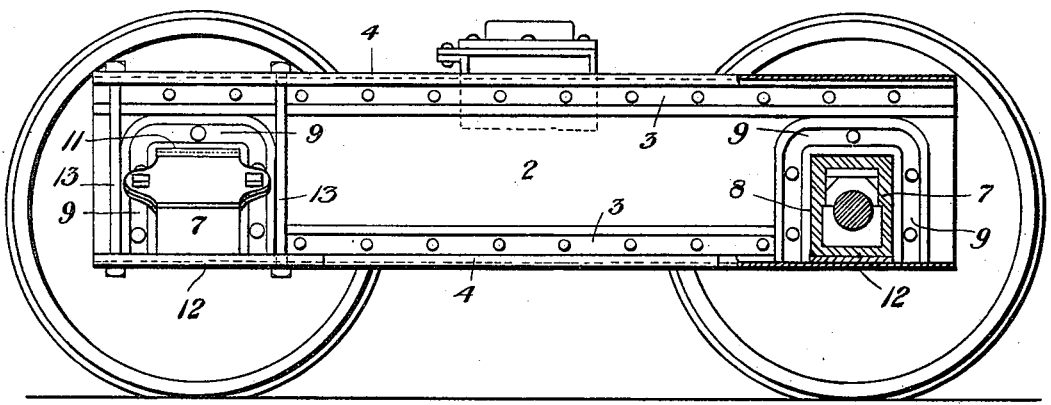
Figure 2:
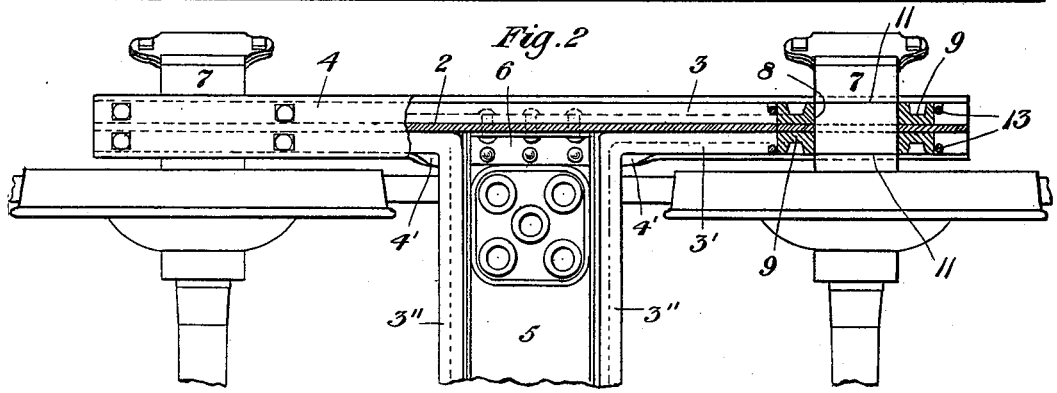
Figure 5:
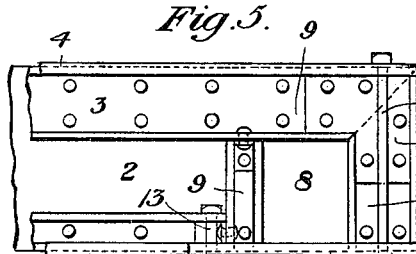
Figure 4:
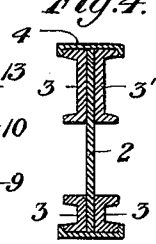
Figure 3:
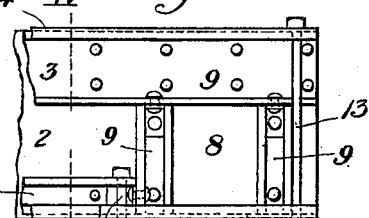
Figure 7:
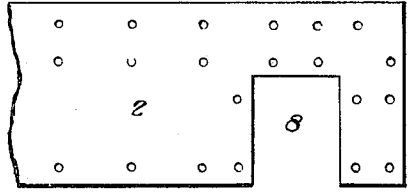
Figure 8:
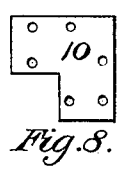
Figure 6:
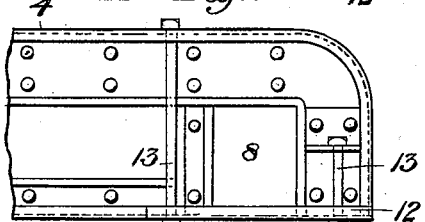
Figure 9:
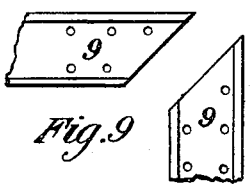

Figure 1 is a side elevation, partly in section, of my improved car-truck. Fig. 2 is a partial plan view, partly in section. Fig. 3 is a detail view, in side elevation, of one end of one of the side members, showing a modified arrangement of the reinforcing members. Fig. 4 is a cross-sectional view on the line IV IV of Fig. 3. Fig. 5 is a view similar to Fig. 3, showing a further modification. Fig. 6 is a similar view wherein the top reinforcing member is turned down around the end. Fig. 7 is a detail view, in side elevation, of the end of one of the plates of the side member. Fig. 8 is a detail face view of the corner-plate used to connect the reinforcing members shown in Fig. 5. Fig. 9 shows details of the meeting ends of the top and end side reinforcing members.

My invention refers to car-trucks, more especially of trucks composed entirely of metal; and it consists of the novel construction and arrangement of the parts, as shall be more fully hereinafter set forth.

Referring now to the drawings, the side members of the truck are composed of a central plate 2, forming its body portion and of the full length thereof. On the outside at the top and bottom the plate is reinforced by longitudinal rolled members, as channels 3, while on the inner side are corresponding upper and lower reinforcing members 3', which at the middle of the truck are continued across from one side member to the other, separated by a central transverse space of the width of the bolster, for which these cross members 3" form upper and lower bearings. They also serve to rigidly connect the side members and act as stiffening-braces, being strongly riveted through the plate and the reinforcing members on each side of it. Above and below the reinforcing members are reinforcing-channels 4, the flanges of which embrace the edges of the reinforcing upper and lower members, to which they are securely riveted.

Transversely arranged across the middle of the truck between the lower cross members 3", to which it is riveted, is a bolster-supporting channel 5, the ends of which abut against the inner sides of the plate 2 and rest even with its lower edge upon the upper faces of the lower reinforcing-channels 4, the inner flanges 4' of which are flattened down, as shown in Fig. 2. A corner-angle 6 is riveted through the ends of channel 5 and the channel 4 and through plate 2 and reinforcing outer lower channel 3', thus firmly incorporating the parts together.

At each end of the truck are located the journal-boxes 7 for the axles, which are made of the usual or standard construction, and to permit of their insertion a rectangular opening 8 is provided at each end of the plate 2, opening downwardly and surrounded on the upper and outer sides by continuous portions of the plate. Surrounding the inner, upper, and outer sides of the opening are reinforcing-frames 9, of channel, angle, or any other suitable shape, laid flat against the inner and outer faces of the plate, to which they are securely riveted, as shown, the framework fitting up under and down against the inside faces of reinforcing-channels 4 and flush with the upper and lower edges of the plate 2 and forming with it a practically homogeneous construction. In Fig. 1 I have shown this reinforcing-frame 9 made of an inverted-U-shaped channel surrounding the opening 8 and firmly joined to the plate. In Fig. 3 the top reinforcing member 3 is made of a depth equaling that of the plate above the aperture 8, while the side reinforcing-frame members consist of vertical channels, all of the parts being riveted strongly together. In Fig. 5 the top reinforcing member 3 is likewise made of a depth equaling that of the plate above the aperture 8, the outer side reinforcing member being made of the same depth and meeting the end of member 3 in a miter-joint, the parts being firmly riveted together and to the plate by a corner-plate 10. In Fig. 6 the top reinforcing member, of the same depth as that of the plate above the aperture 8, is turned downwardly at right angles and riveted to that portion of the plate forming the end of the aperture, thus making a strong and rigid outer side for the journal-box housing. In both Figs. 5 and 6 the inner side reinforcing member of framing 9 consists of a separate piece of channel, preferably of reduced width, also riveted to the plate. In all of these forms of construction the reinforcing-frame members may be made to fit in between the retaining-lugs 11 of the journal-boxes, the upper and lower reinforcing members 4 being somewhat wider. The aperture being surrounded, as thus shown and described, thus constitutes a vertical housing for the journal-box of great strength, rigidity, and simplicity of construction. The lower side is inclosed by a horizontal bar or piece 12, forming a continuation of the lower reinforcing member 4, but separate therefrom, so as to be removable to permit of insertion and removal of the journal-box. The bar 12 is held in position by bolts 13, which pass through it and through the upper member 4 or through the lower reinforcing-channel or supplemental brackets, as may be best adapted to the construction.

As thus constructed the side members of the truck from one extremity to the other are practically solid, while their strength is greatly increased at the points where the main plate is cut out by means of the reinforcing-framework for the journal-box housing. In a truck adapted to receive vertically-removable journal-boxes this is an especially-desirable feature, and my invention will be found to provide such a truck wherein a minimum of depth with the requisite strength is secured without the necessity of special forms of pressed material, as it will be noted that my truck is composed throughout of merchant-rolled steel shapes, such as are in common use and readily available. Very little cutting or fitting is necessary and none of the parts are complicated or difficult to make or assemble, while in addition to using shapes found already rolled the work of cutting to size and putting together, as well as the percentage of scrap, is reduced to a minimum. All special or pressed shapes are avoided, castings are dispensed with, ample opportunity is provided for attachment of brake and other connections, the entire truck is comparatively light in proportion to its strength, its parts are few and simple in construction, and it is not liable to derangement or breakage.

The truck is well adapted to be built by mechanics of ordinary ability in a shop having the usual appliances and tools and when constructed as I have shown and described is exceedingly strong, durable, and well adapted to the strains, wear, and accidents to which this class of rolling-stock is peculiarly liable.

What I claim is—

1. In a car-truck, a composite side frame consisting of a plate having end recesses, upper and lower longitudinal reinforcing members at each side, and reinforcing-frames surrounding the recesses incorporated with the plate and a removable frame inclosing the recess on its lower side in alinement with the lower edge, substantially as set forth.

2. In a car-truck, a composite side frame consisting of a plate having end recesses, upper and lower longitudinal reinforcing members at each side, and reinforcing-frames surrounding the recesses, incorporated with the plate, a removable frame inclosing the recess on its lower side on a plane parallel with the lower edge, and retaining-bolts therefor passing through the frame and the reinforcing-frames, substantially as set forth.

3. In a car-truck, a composite side frame consisting of a plate having end recesses, upper and lower longitudinal reinforcing members at each side, and reinforcing-frames surrounding the recesses, incorporated with the plate, and top and bottom longitudinal members embracing the edges of the plate and the longitudinal reinforcing members, substantially as set forth.

4. In a car-truck, a composite side frame consisting of a plate having end recesses, upper and lower longitudinal reinforcing members at each side, and reinforcing-frames surrounding the recesses, incorporated with the plate, and top and bottom longitudinal members embracing the edges of the plate and the longitudinal reinforcing members, and a lower removable frame inclosing the recess, substantially as set forth.

In testimony whereof I affix my signature in presence of two witnesses.

CYRUS M. CARNAHAN.

Witnesses:
  PETER J. EDWARDS,
  C. M. CLARKE.